April 4, 1967 C. A. DRAPER, JR 3,312,784

TELEPHONE SIGNALLING SYSTEM INCLUDING A PULSE-CORRECTING SYSTEM FOR MAINTAINING CONSTANT MAKE-TO-BREAK TIME RATIO WITH VARYING DIAL PULSE SPEEDS

Filed Jan. 2, 1964 2 Sheets-Sheet 1

INVENTOR:
COSBY A. DRAPER, JR.

BY [signature]
HIS ATTORNEY.

INVENTOR:
COSBY A. DRAPER, JR.
BY [signature]
HIS ATTORNEY.

United States Patent Office 3,312,784
Patented Apr. 4, 1967

3,312,784

TELEPHONE SIGNALLING SYSTEM INCLUDING A PULSE-CORRECTING SYSTEM FOR MAINTAINING CONSTANT MAKE-TO-BREAK TIME RATIO WITH VARYING DIAL PULSE SPEEDS

Cosby A. Draper, Jr., Lynchburg, Va., assignor to General Electric Company, a corporation of New York Filed Jan. 2, 1964, Ser. No. 335,206
5 Claims. (Cl. 179—16)

This invention relates to a telephone signalling system and, more particularly, to a system wherein signalling between two remote locations is in the form of pulsed tone signals.

Telephone signalling between two remote locations is, of course, old and well known. One form of such telephone signalling is customarily referred to as "E and M" signalling. When a subscriber lifts his phone off the hook in order to place a call, a relay is actuated which connects the "M" or transmit lead to ground to establish a circuit which is intermittently interrupted by the dial mechanism of the subscriber's telephone to produce either a pulsating D.-C. signal or a pulsed tone signal. These pulsed signals are multiplexed and transmitted over a cable or microwave link to the remote exchange to actuate suitable relays and a connecting stepping switch to ring the telephone being called and to establish the communication link. At the called station, the "E" lead is intermittently grounded in response to the pulsating D.-C. tone signals to actuate the relays and connecting stepping switches to establish the connection between the two telephones.

The pulsating D.-C. or tone signal combinations, which represent the dialing digits, are produced through the medium of the dial mechanism of the telephone which is a mechanical device that intermittently "makes" (closes) and "breaks" (interrupts) a circuit to produce the pulsating D.-C. or pulsating tone. These dialing impulses must control relays and stepping switches both at the local and remote exchanges, and it is, therefore, highly desirable to establish and maintain a fixed ratio between the pulse intervals representing "make" and "break" periods. One such standard, established in the telephone industry, provides that the duration of the "break" period shall be sixty-four percent (64%) of the digit interval and the "make" period thirty-six percent (36%) of the digit interval.

The dialing rate or dial speed is also set at some predetermined nominal value so that optimum operation of the entire system can be maintained. Thus, for example, the nominal dialing rate or speed may be set at ten (10) impulses per second (i.p.s.). However, since the impulses are generated by a mechanical dialing device, improper adjustment of the dial mechanism or operational wear and tear may produce variations in dialing speeds. It has been found, for example, that in a system having a nominal dialing speed of ten (10) i.p.s. the dialing speed or rate may fluctuate between seven (7)–thirteen (13) i.p.s. This variation produces undesirable variations of the "E" lead "make" to "break" time ratio at the receiving terminal. A change in the dialing rate, and hence in the dialing pulse repetition frequency, changes the period $T_D$ of each of the dialing pulses. The "make" to "break" ratio $T_M/T_B$ of the transmitted dialing pulses may very well remain substantially constant even though the duration of the "make" period $T_M$ and of the "break" period $T_B$ varies. However, at the receiving end, the dialing impulses control suitable relays which open and close the "E" lead. The "E" lead relay, however, has a drop-out time $T_{DO}$ which is fixed. Thus, if the dialing impulse period $T_D$ varies, the "E" lead "make" to "break" time ratio $T_{ME}/T_{BE}$ is varied since the interval that the "E" lead relay is energized, $T_{BE}$, is equal to the "make" time $T_M$ of the dialing pulse and the fixed drop-out time $T_{DO}$ of the "E" lead relay, i.e. $T_{BE}=T_M+K$, where $K=T_{DO}$. If the dial speed is varied so that the period $T_D$ of the dialing impulses changes, the "E" lead "make" to "break" time ratio changes because of the constant K in the equation $T_{BE}=T_M+K$. This, in turn, may produce highly undesirable results in the operation of the relays and the stepping switches which establish the connection to the called telephone. A need exists, therefore, for a system which compensates for these dial speed variations by producing a substantially constant "E" lead "make" to "break" time ratio even though the dial pulse rate at the calling station varies over a substantial range.

It is, therefore, an object of this invention to provide a signalling system wherein the "E" lead "make" to "break" time ratio is maintained substantially constant;

It is a further object of this invention to provide a signalling system wherein the "E" lead "make" to "break" time ratio is maintained substantially constant even though the dial pulse rate varies substantially;

Another object of this invention is to provide a telephone signalling system wherein the "E" lead energizing pulse interval is so varied with dial speed variations that the "E" lead "make" to "break" time ratio remains substantially constant;

Other objects and advantages of the invention will become apparent as the description thereof proceeds.

In a preferred embodiment of the invention a telephone signalling system is described wherein a pulsed A.-C. tone signal is utilized for signalling purposes. A pulsed tone signal is transmitted to the receiving exchange over any suitable communication medium to actuate the "E" lead and suitable connecting stepping switches to establish a connection to the called phone. The received tone pulses are rectified, shaped, and modified to produce an energizing pulse which actuates the "E" lead relay to selectively ground the "E" lead in response to the tone pulses. In order to maintain the "E" lead "make" to "break" time ratio substantially constant with variations of dialing speeds, the duration of the "E" lead relay energizing pulses is made to vary inversely with the dialing pulse repetition rate. That is, should the dialing rate increase so that the "make" interval of the dial pulses decreases, the duration of the energizing pulse is decreased so that the sum of the energizing pulse interval plus the fixed drop-out time of the "E" lead relay is varied to maintain the "E" lead "make" to "break" time ratio substantially constant.

The novel features, which are believed to be characteristic of this invention, are set forth with particularity in the appended claims. The invention itself, however, both as to its organization and method of operation, together with further objects and advantages thereof, may best be understood by reference to the following description taken in connection with the accompanying drawings in which:

FIG. 1 is a block diagram of a signalling circuit constructed in accordance with the invention wherein the pulsating dial tones are received and utilized to control the "E" lead and "E" lead switch and to maintain a substantially constant "E" lead "make" to "break" time ratio.

Figure 1:
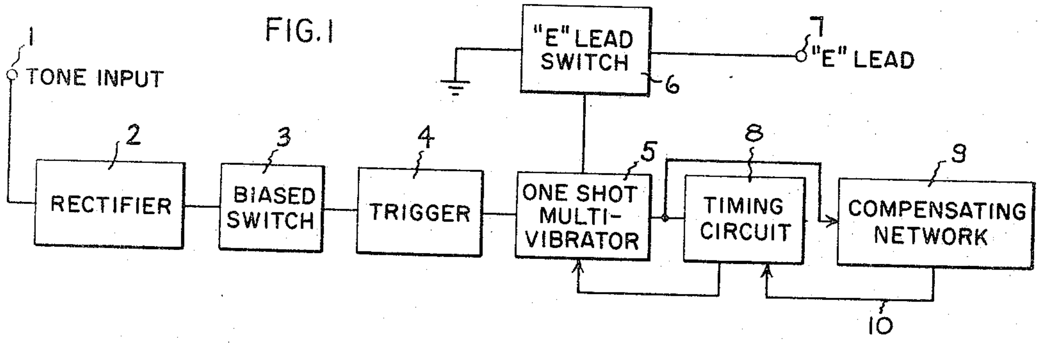
FIG. 1 is a block diagram of the signalling circuit which maintains a constant "E" lead "make" to "break" time ratio in response to the received dial tone pulses.

The received dial tones, both pulsed and continuous, representing the dialing digits identifying the called telephone or a line "idle" signal, are impressed on input terminal 1. These dial tones may typically be a 2600 cycle tone signal which is suitably pulsed by the dialing mechanism of the remote calling telephone, not shown. These pulsed dial tones are multiplexed onto a suitable carrier and transmitted over a communication medium such as a microwave link or a cable to multiplexing equipment at the local terminal, also not shown. The dial tone signals are demultiplexed by demodulating the dial tone from their carrier and supplied to the input terminal 1.

The received dial tone signals at input terminal 1 are rectified in a rectifier 2 to produce a unidirectional biasing voltage for biased switch 3. Biased switch 3 is disabled by the bias voltage from rectifier 2 and is actuated in the absence of the bias voltage to gate trigger circuit 4. Trigger circuit 4 is thus operative when there is no tone signal at input terminal 1, as would be the case during the time that a line is seized, during the "make" period of the dialing pulse tones, and after the circuit has been established between the two telephones. Trigger 4, when gated by biased switch 3, produces trigger pulses which reverse the normal stable state of "one-shot" multivibrator 5 to generate energizing pulses for "E" lead switch 6. Switch 6 intermittently connects "E" lead 7 to ground, thereby actuating the relays and connecting stepping switches, not shown, of the terminal to establish the circuit to the called phone. For reasons presently to be described, trigger circuit 4 is characterized by the fact that when initially gated from the output of biased switch 3 (i.e., upon the disappearance of the tone signal), there is an initial delay period before trigger 4 produces the first output trigger pulse. The time delay of trigger 4 is chosen, as will be explained presently, to be greater than the maximum "make" time of the dialing pulses for the expected range of dialing speed of the system. After the initial delay time, trigger 4 becomes free running. The period of the output trigger pulses during the free-running state is less than the drop-out time of the "E" lead switch so that during the free-running operation of trigger 4, the "E" lead switch is not deenergized.

"One-shot" multivibrator 5 is coupled to a timing circuit 8 which controls the time that the "one-shot" 5 remains in the unstable state, and, hence, the time that the "E" lead switch is energized. A "one-shot" or monostable multivibrator is a device which includes two cross-connected conductive elements and is characterized by the fact that it has a single stable or quiescent state, i.e., with one of the elements conducting. The appearance of an input triggering pulse of the proper polarity reverses the normal stable or quiescent state of the device so that the conducting states of the elements are reversed. The reversal of the conducting state is, however, temporary, and the "one-shot" returns to its stable or quiescent state a fixed time after being triggered. Timing circuit 8 determines the length of time that the "one-shot" remains in the reversed or unstable state before returning to its original stable state. Customarily the period that the "one-shot" remains in the unstable state is fixed and remains fixed even though the repetition rate of the input trigger pulses changes.

In the circuit of FIG. 1 any change in the trigger pulse rate to "one-shot" 5 represents a change in the repetition rate of the dialing pulses. This, as pointed out briefly above, produces a change in the "E" lead "make" to "break" time ratio and produces various undesirable results in the signalling system. Hence, some means must be provided to compensate for any changes in the triggering pulse repetition rate so that the ratio of "E" lead "make" to "break" time is maintained substantially constant. Compensating network 9 performs this function by producing a control signal which is proportional to the length of time that "one-shot" multivibrator 5 is in the quiescent or stable state. This control signal is coupled over lead 10 to timing circuit 8 to vary the time that "one-shot" multivibrator 5 is in the unstable state inversely with the trigger pulse rate. Thus, if the trigger pulse rate to the "one-shot" increases, representing an increase in the dialing rate, and hence reducing the time duration of the actual "make" and "break" portion of the dialing pulses, compensating network 9 generates a voltage which controls timing circuit 8 in such a manner as to reduce the time that "one-shot" 5 is in the unstable state. This correspondingly reduces the duration of the energizing pulse to "E" lead switch 6 so that the total time that the "E" lead switch is energized and "E" lead 7 is connected to ground is reduced sufficiently to maintain the "E" lead "make" to "break" time ratio constant, even though the total period $T_D$ of each dialing pulse is reduced. Similarly, if the trigger pulse rate decreases, representing a decrease in the dialing rate and an increase in the "make" and "break" times, the compensating network generates a voltage which increases the duration of the energizing pulse applied to "E" lead switch 6, thereby also maintaining the "E" lead "break" to "make" time ratio constant.

In the absence of such a compensation network, it will be immediately apparent that the "E" lead "make" to "break" time ratio would not remain constant as the pulse rate varies. In the absence of the network, the duration of the interval that the "E" lead switch is energized ($T_{BE}$) is fixed, being equal to the fixed time ($T_M$) the "one-shot" is in its unstable state and the fixed drop-out time ($T_{DO}$) of the relay. If $T_{BE}$ is constant, it is obvious that the "make" period $T_{ME}$ must either increase or decrease as pulse period $T_D$ varies, thereby varying the "E" lead "make" to "break" ratio. If the pulse repetition rate increases, thereby decreasing the pulse period $T_D$, the "E" lead "make" time $T_{ME}$ is of necessity reduced since the "E" lead "break" time $T_{BE}$ is constant. As a result, the "E" lead "make" to "break" time ratio decreases. Similarly, if the pulse rate decreases, increasing the pulse period $T_D$, the "E" lead "make" time increases, and the "E" lead "make" to "break" time ratio increases. However, by varying the duration of the "E" lead switch energizing pulse as a function of pulse rate, the desired "E" lead "make" to "break" time ratio is maintained.

Figures 3, 4, 5, 6, 7, 8:
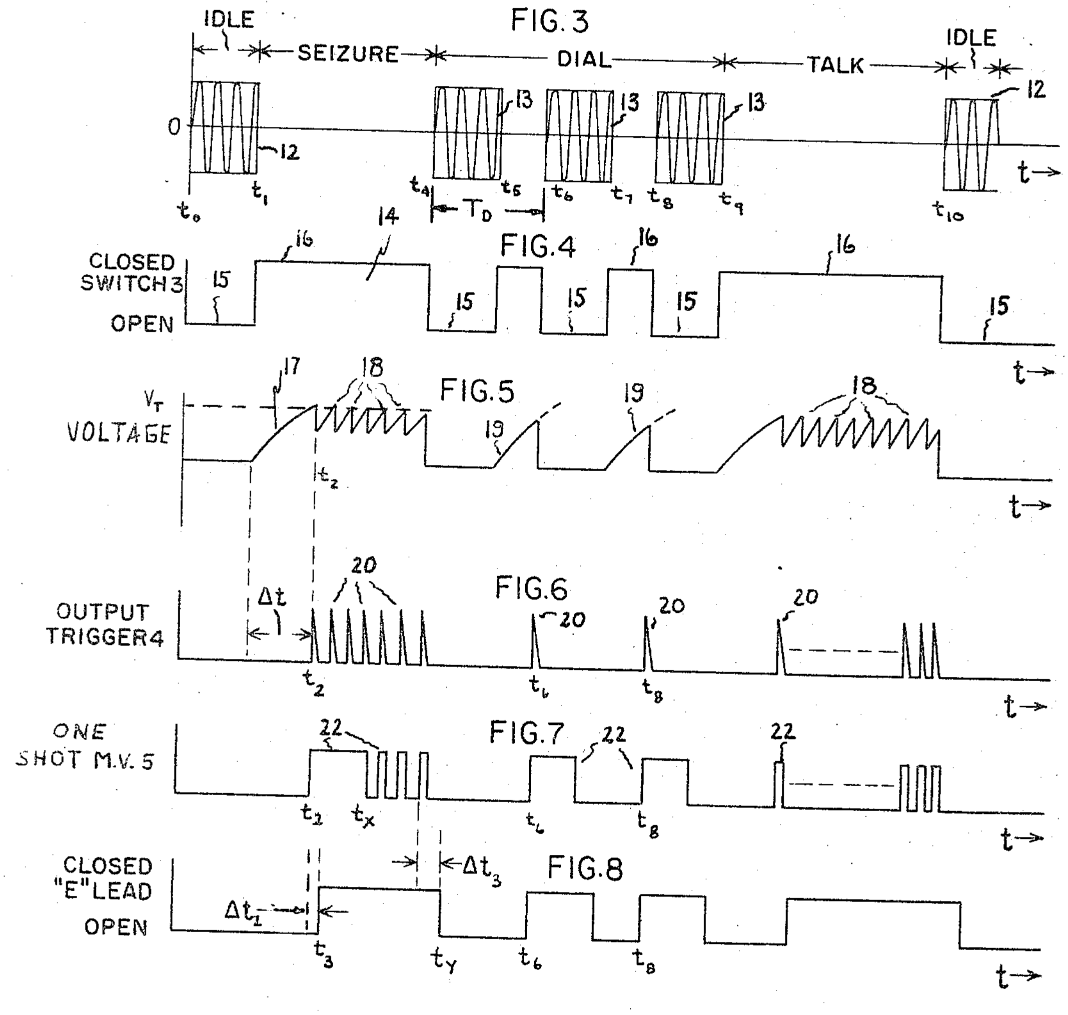
FIGS. 3–8 are waveform diagrams illustrating the operational conditions in various portions of the circuit under varying conditions and are useful in understanding the invention.

The manner in which the circuit performs the signalling function and maintains the desired "make" to "break" time ratio may best be understood by reference to FIGS. 3–8. FIG. 3 represents graphically the waveforms of the pulsed tone signals in a telephone signalling system of which the circuit of FIG. 1 forms a part. Thus, in such systems, it is customary to utilize a 2600∼ cycle "idle" tone, shown at 12, which is continuously transmitted when the circuit is idle and the telephone is on the hook. This 2600 cycle tone signal 12, after transmission over the communication link, is received at tone input terminal 1.

When the subscriber wishes to place a call and lifts the telephone off the hook at time $t_1$, the tone signal circuit is interrupted, terminating transmission of tone signal 12 during the interval from $t_1$ to $t_4$ that the line finder equipment is seizing a line. When the subscriber dials, the dial mechanism alternately "makes" and "breaks" the tone circuit, producing a tone burst 13 during each "make" period. The period $T_D(t_4-t_6)$ of each dialing pulse is determined by the dial mechanism speed and is normally set a fixed nominal rate such as ten (10) impulses per second (i.p.s.) for example. The number and combination of the tone pulses, of course, represent the identifying digits of the called telephone and control the electromechanical devices, such as relays and connecting stepping switches, etc., which connect the called telephone to the communication channel and thence to the calling telephone. For the sake of simplicity of illustration, only three (3) such dialing pulses are shown. At the end of the dialing sequence, the connection is established and maintained for the duration of the conversation, i.e., from $t_9$–$t_{10}$. At time $t_6$, the parties hang up, the line is disconnected, and the idle tone 12 is re-established.

When a tone signal is present at input terminal 1, rectifier 2 produces a unidirectional biasing voltage which controls switch 3 in the manner illustrated by curve 14 of FIG. 4. During tone intervals, i.e., $t_0$–$t_1$, $t_4$–$t_5$, $t_6$–$t_7$, $t_8$–$t_9$, $t_{10}$, etc., switch 3 is open, as shown at 15 of the curve, thereby disabling trigger circuit 4. When the subscriber picks up his telephone at $t_1$, terminating the idle tone 12, the output from rectifier 2 drops to zero, and switch 3 closes as shown at 16. Closure of switch 3 gates trigger circuit 4. As illustrated in FIG. 5, trigger circuit 4 includes an internal timing and time delay circuit, presently to be described, which delays operation of the trigger circuit for a fixed period of time after which the circuit becomes free-running. Curve 17 shows the voltage waveform of the trigger timing circuit. From $t_1$–$t_2$ the voltage of the timing circuit rises exponentially toward the firing voltage $V_T$ of the trigger. At $t_2$ the triggering voltage is exceeded, and trigger 4 fires and then continues to fire at a free-running rate shown by the sawtooth curves 18. When switch 3 is again opened at $t_4$, $t_6$, $t_8$, and $t_{10}$ upon appearance of the tone bursts 13 or the idle tone 12, the timing circuit of trigger 4 is disabled, and the timing voltage goes to zero. Each time trigger 4 fires in its free-running state or is disabled by action of switch 3, a triggering pulse 19 is produced at the output of trigger 4 and is applied to "one-shot" 5. The duration of the time delay $\Delta t_1 = |t_2 - t_1|$ is chosen such that it is greater than the "make" period of the dialing pulses for the entire expected range of dialing speeds. This is to insure that the "E" lead switch is always actuated at the initiation of the "break" period of the dialing pulses and eliminates the possibility of producing a trigger pulse during the "make" period and inadvertently triggering the "E" lead switch at the wrong time.

Thus, during each "make" period of the dial pulses (the intervals $|t_6 - t_5|$, $|t_8 - t_7|$ of FIG. 1), the delay and timing circuit begins charging exponentially towards the triggering voltage $V_T$ as shown by the curves 19 of FIG. 5. However, since the time delay $\Delta t_1$ is greater than the "make" period $T_M$ over the entire expected dialing pulse range, the critical triggering voltage $V_T$ is never reached during the "make" interval, and no triggering pulse is produced. Only the appearance of the next tone burst 13, at times $t_6$, $t_8$, etc., produces a triggering pulse by opening switch 3 and disabling trigger 4.

The triggering pulses 20 are applied to "one-shot" 5, and, as shown in FIG. 7, generate energizing pulse 22 which actuates "E" lead switch 6. Switch 6, when energized, as can be seen in FIG. 8, connects the "E" lead to ground with a slight delay due to the pick-up time of the relay forming part of switch 6. The delay between $t_2$, when the energizing pulse is generated and $t_3$ when the relay picks up and grounds the "E" lead, will occur only if a relay is used since such relays have an inherent delay time before they are actuated in response to the energizing voltage. Of course, if a switch other than one utilizing a relay is used, as would be the case if a solid state switch were used, no pick-up or drop-out time delay is present.

The first energizing pulse 22, from "one-shot" 5, is, as may be noted from FIG. 7, of substantially greater duration than any of the other energizing pulses. This is due to compensating network 9. As was pointed out above, the compensating network produces a reference voltage which is proportional to the time that "one-shot" 5 is in its stable or quiescent state. The lower the frequency of the input trigger pulses, the longer the "one-shot" remains quiescent and, hence, the larger the output voltage from compensating network 9. Prior to time $t_1$, the circuit was idle for a lengthy period. There were no triggering pulses applied to "one-shot" 5 which, therefore, remained in the quiescent or stable state for a time which is large relative to the expected dial pulse period. The trigger pulse rate to the "one-shot" was thus effectively reduced to zero, and the control voltage from the compensating network is at a maximum. Upon the first triggering of the "one-shot," at $t_2$, the effect of this control voltage is to extend the time that the "one-shot" is in the unstable state and hence, the duration of the "E" lead switch energizing pulse to a maximum. "One-shot" 5 thus remains in the unstable state, and "E" lead switch 6 is energized for the interval $t_2 - t_x$. At time $t_x$, the "one-shot" reverts to its stable state, terminating energizing pulse 22. During the $t_2 - t_x$ interval, any triggering pulses 20 from trigger 4 have no effect on the "one-shot" which is already in the unstable state. However, after time $t_x$, the next trigger pulse again triggers the "one-shot" into the unstable state, generating another energizing pulse 22. The duration of this and subsequent pulses during the seizure period, $t_1 - t_x$, is quite short, however, since the control voltage from the compensating network is at a minimum value due to the fact that the "one-shot" only remains in the stable state for a very short period of time before the arrival of the next triggering pulse. That is, the repetition rate of trigger 4, in the free-running state, is sufficiently high to reduce the compensating network control voltage, which is a function of the time the "one-shot" is in the stable state, and, hence, the energizing pulse duration to a minimum. Furthermore, the trigger pulse repetition rate must be high enough in the free-running state so that the trigger pulse period is less than the drop-out time of the relay in the "E" lead switch. This will insure that the "E" lead remains closed during the seizure period $t_1 - t_4$ and the talking period $t_9 - t_{10}$ even though the energizing pulses from "one-shot" 5 are repeatedly terminated. After the first energizing pulse 22 is terminated at time $t_x$, removing the energizing voltage from the "E" lead relay, the "E" lead relay is not immediately de-energized since it has a finite drop-out time, $T_{DO}$, shown as the time increment $\Delta t_3$ in FIG. 8. If the period of the triggering pulses 20 is less than the relay drop-out time $T_{DO}$, another energizing pulse is generated by "one-shot" 5 in response to the next trigger pulse before the relay can drop out, thus maintaining the "E" lead relay continuously energized during the seizure and talk periods. "E" lead switch 6 is de-energized, and the "E" lead disconnected from ground only after the appearance of the first dial pulse tone burst 13 and after termination of the talk period at $t_{10}$ and the appearance of idle tone 10 since the interval before the appearance of another triggering pulse 20 is now greater than the relay drop-out time $T_{DO}$.

During the dialing interval, a trigger pulse is produced at the leading edge of each tone burst 13 and generates an energizing pulse 22, the duration of which is a function of the interval that the "one-shot" is in the stable or quiescent state which, in turn, is a function of the dial pulse rate.

Figure 2:
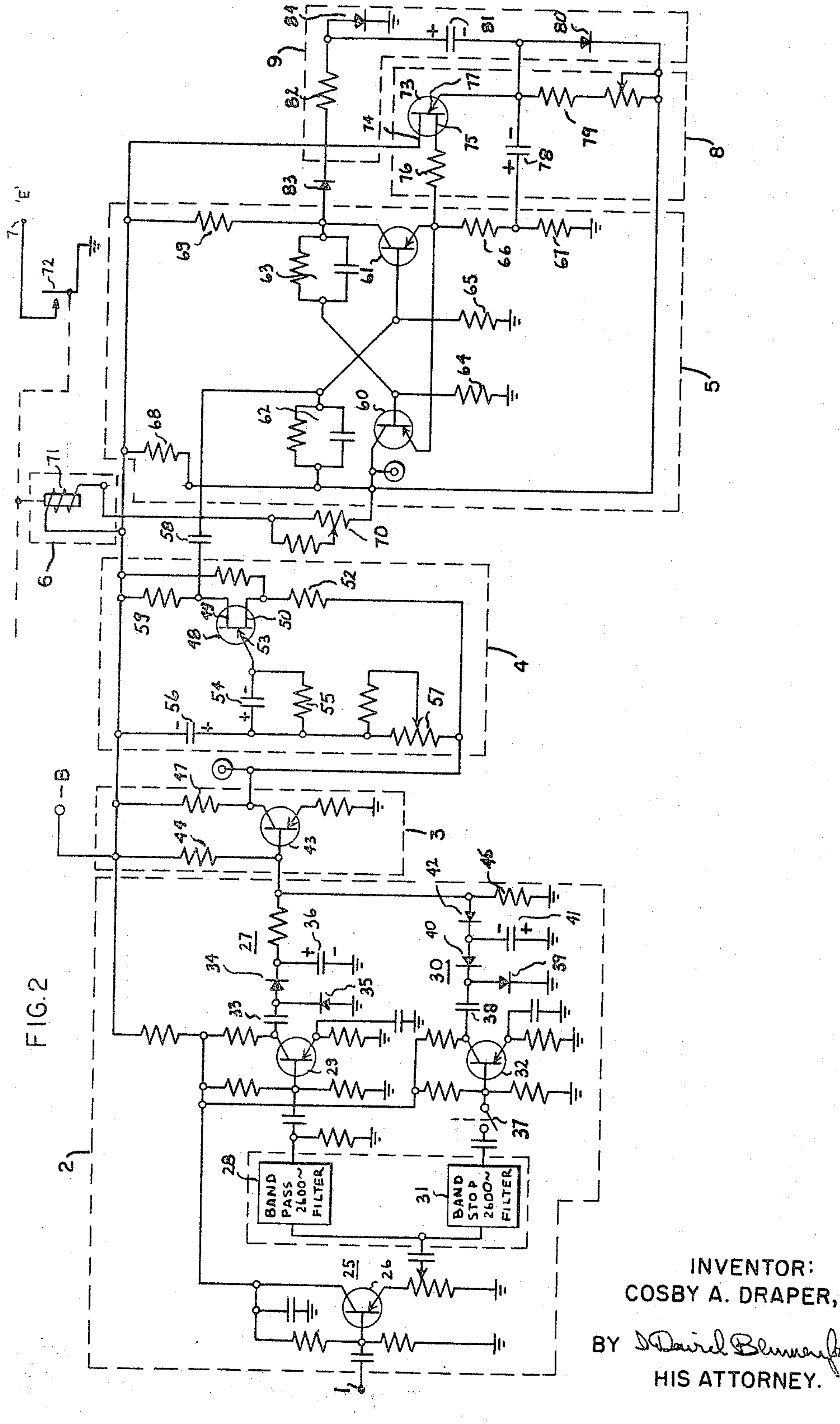
FIG. 2 is a circuit diagram of the signalling circuit illustrated in FIG. 1.

FIG. 2 is a detailed circuit diagram of the signalling system illustrated generally in FIG. 1 showing rectifier 2, biased switch 3, trigger circuit 4, "one-shot" multivibrator 5, "E" lead switch 6, timing circuit 8, and compensating network 9 within the dotted rectangles. The tone from the communication channel is impressed on input terminal 1 and applied to a transistor stage 25. Stage 25 consists of a PNP transistor 26 connected in the emitter-follower configuration and translates the input tone signal which is coupled to its base electrode. The output from emitter-follower 25 is coupled to a first rectifying channel 27 through a 2600 cycle bandpass filter 28 and transistor amplifier 29 and to a second rectifying channel 30 through a 2600 cycle bandstop filter 31 and transistor amplifier 32. The output from the 2600 cycle bandpass filter is applied to the base electrode of transistor amplifier 29 connected in the common emitter configuration. The amplified signal at the collector of transistor 29 is coupled through coupling capacitor 33 to a half-wave rectifying circuit comprising the diodes 34–35 and storage capacitor 36. Diode 34 is poled to be conductive only during positive alternation of the tone signal while diode 35 by-passes the negative alternations to ground. Storage capacitor 36 is charged during the positive alternations to the polarity shown and provides a positive biasing voltage for biased switch 3. Whenever the 2600 cycle tone is present at input terminal 1, a positive biasing voltage is produced at the output of rectifying channel 27 which disables biased switch 3 by biasing it into the nonconducting or open state.

The alternate rectifying path 30 is provided to produce a negative biasing voltage which cancels the positive biasing voltage from rectifying path 27 after connection between the two telephones has been established, and the parties are carrying on their conversation. It will be noted that the instant system is a so-called "in-band" signalling system in that the 2600 cycle idle and dial pulse tone signals, which are utilized for signalling purposes, fall within the normal audio or voice band. Hence, during the talk period, the voice frequencies, appearing at input terminal 1 of the signalling system, include 2600 cycle components. This produces a positive bias at the output of rectifying channel 27 which would disable switch 3, terminating the trigger pulses from trigger circuit 4, ultimately de-energizing "E" lead switch 6, and causing the "E" lead to drop out during the talk period.

A biasing voltage must be provided which cancels the positive biasing voltage due to the 2600 cycle voice signals that pass through filter 28 without in any way affecting the positive biasing voltage due to a 2600 cycle tone signal. To this end, the alternate rectifying path 30 contains a 2600 cycle bandstop filter 31 which transmits energy in all portions of the voice spectrum but the 2600 cycle band. The output of this filter is coupled through a selectively actuated switch 37 to the base electrode of PNP transistor amplifier 32 connected in the common-emitter configuration. Switch 37 is controlled by the "E" lead switch and is closed whenever the "E" lead relay has been energized. The output from transistor amplifier 32 is coupled through a coupling capacitor 38 to a half-wave rectifying network consisting of diodes 39–40 and storage capacitor 41. Diode 40 is poled to be conductive only during the negative alternations of the tone signal while diode 39 bypasses the positive alternations to ground. During negative alternations, storage capacitor 41 is charged to the polarity shown and provides a negative biasing voltage. The biasing voltage established across capacitor 41 is coupled through a diode 42 to the input terminal of biased switch 3 and cancels the positive biasing voltage from channel 27.

If only 2600 cycle tone signals are present at input terminal 1, there is a positive bias voltage produced at the output of rectifying channel 27. However, rectifying channel 30 produces no negative bias voltage even though switch 37 may be closed since bandstop filter 31 blocks energy in the 2600 cycle band. In this event, the signalling system functions in the normal and desired manner.

When voice frequencies lying in the audio range, from 25–15,000 cycles (although in telephony the audio range is customarily limited from 300 to 3800 cycles), are received at input terminal 1, that portion of the voice energy, which is in the 2600 cycle, bandpasses through filter 28 to produce a positive bias at the output of rectifying channel 27. This would, in the absence of channel 30, cause switch 3 to be biased into the open state, terminating the free-running operation of trigger 4, which ultimately cause the de-energization of "E" lead switch 6. However, voice frequency energy outside of the 2600 cycle bandpasses through bandstop filter 31, is rectified, and produces a negative biasing voltage at the output of rectifying path 30. This negative biasing voltage opposes and cancels the positive biasing voltage from channel 27, thereby eliminating the possibility that 2600 cycle voice energy, as opposed to 2600 cycle tone signals, will drive switch 3 into the open condition and disable the remaining portion of the signalling system.

Biased switch 3 includes a PNP transistor switch 43 which is normally biased into the conducting state by means of a voltage divider connected to the base electrode. The voltage divider consists of resistors 44 and 45 connected between the negative terminal B— of the supply voltage source and ground. The base is connected to the junction of the voltage divider resistances 45 and 46, and the emitter is connected to ground so that the base is more negative than the emitter, and the transistor is biased into conduction. In the absence of a 2600 cycle tone signal there is no positive biasing voltage at the output of rectifier 2, so that transistor 43 remains in the conducting state. The apparance of the tone signal produces a positive biasing voltage so that the base of the transistor becomes more positive than the emitter, and transistor 43 is biased to cut off.

Trigger 4 is a delayed, gated oscillator which is operative to produce triggering pulses only in the absence of tone signals. Trigger 4 is gated by biased switch 3 whenever that switch is in the conductive state, i.e., in the absence of 2600 cycle tone signals. Trigger 4 includes a timing and delay circuit which inhibits the generation of trigger pulses for a fixed period of time after the trigger is initially gated. If the gating interval is sufficiently long to exceed the delay time, the trigger becomes free-running during the remainder of the interval. If the duration of the gating interval is less than the fixed delay time, a single triggering pulse is produced at the end of the gating period when trigger 4 is disabled. The delayed, gated oscillator of trigger 4 is described and claimed in a copending application, Ser. No. 335,021, filed concurrently with the instant application on January 2, 1964, in the name of Cosby A. Draper, Jr., and entitled Gated Pulse Generator With Time Delay, now U.S. Patent No. 3,260,962, issued July 12, 1966, and assigned to the assignee of the present application. In the signalling circuit, forming the subject matter of the instant invention, the time delay is chosen to be greater than the greatest expected dial pulse "make" period over the entire range of dial pulse rates. For example, if the nominal dial pulse rate is ten (10) impulses per second, but the rate may vary from seven (7)–thirteen (13) impulses per second, the delay time is chosen to be greater than the "make" period of the dialing pulses over the entire range. Assuming that the "make" period is thirty-six percent (36%) of the dial pulse period $T_D$, the maximum "make" period occurs for a seven (7) impulses per second dial pulse rate in which event the pulse period $$T_D=\frac{1}{7\text{ i.p.s.}}=\cdot 143\text{ second}$$

and the "make" period is .36 $T_D$=.05 second. Hence, the delay period is chosen to be greater than .05 second, the greatest expected dial pulse "make" period.

Trigger circuit 4 is a relaxation oscillator gated by biased switch 3. The relaxation oscillator includes a unijunction transistor 48 having its bases 49 and 50 connected respectively to B— through resistor 51 and to the collector of transistor 43 through resistor 52. Emitter 53 is connected through capacitor 54 and a shunt resistor 55 to the junction of an R–C timing and delay circuit consisting of capacitor 56 and the resistor 57. The timing circuit is connected between the B— terminal and the collector of transistor 43.

Unijunction transistor 48 acts essentially as a solid state switch which is periodically driven into conduction by the action of the timing circuit comprising capacitor 56 and resistor 57. Whenever the unijunction is driven into conduction, a short trigger pulse is produced at base 49 which is then applied through coupling capacitor 58 to "one-shot" multivibrator 5.

Unijunction transistor 48 is a solid state semiconductor formed of a bar of *n*-type silicon having two ohmic contacts 49 and 50 which form the base electrodes of the device. A single rectifying junction is formed between the emitter 53 on the opposite side of the bar, adjacent to base electrode 49. An interbase resistance of several thousand ohms normally exists between base 49 and base 50. With no emitter current flowing, the silicon bar acts like a simple voltage divider, and a certain fraction, $\eta V_{BB}$, of the voltage across the bar, appears at emitter 53. If the external voltage applied to emitter 53 is less than $\eta V_{BB}$, which quantity is usually termed the intrinsic stand-off ratio of the unijunction transistor, the emitter is reverse-biased, and only a small emitter leakage current flows. If, however, the external voltage applied to the emitter exceeds the intrinsic stand-off ratio, the emitter is forward-biased, and emitter current flows. This current consists primary of holes injected into the silicon bar which holes move from emitter 53 to base 49 and results in an increase in the number of electrons in the emitter base region. As a result, there is a decrease in the resistance between the emitter 53 and the base 49 so that as emitter current increases, the emitter voltage decreases, and a negative resistance characteristic is obtained.

The voltage at emitter 53 is controlled by the voltage at the junction of capacitor 56 and resistor 57 which provides the discharge path for the charge stored in capacitor 56. Capacitor 56 and resistor 57 establish the initial delay after gating, after which the trigger becomes free-running at a rate controlled by the combination of capacitor 54 and resistor 55.

The operation of trigger 4 and the manner in which the initial delay and the subsequent frequency characteristics are achieved may be explained as follows: As long as a tone signal is present at input terminal 1, the positive bias voltage at the output of rectifying path 27 reverse-biases PNP transistor 43 into the nonconducting state. When the transistor is in the nonconducting state the resistance of the emitter-collector path is sufficiently large so that transistor 43 is essentially an open circuit. The collector of transistor 43 is thus substantially at the voltage of the B— terminal. Both plates of capacitor 56 are, therefore, connected to the B— terminal; the upper plate directly, and the lower plate through resistor 57 and collector resistor 47. Similarly, both bases of unijunction transistor 48 are at the same potential since both are connected to the B— terminal; base 50 through resistor 57 and collector resistor 47, and base 49 through resistor 59.

Emitter 53 is reverse-biased, and no current flows. When the tone signal, at input terminal 1, disappears, the positive biasing voltage at the output of rectifying path 27 also disappears, and transistor 43 is biased into the conducting state. Transistor 43 conducts heavily to the point of saturation. The emitter-collector voltage resistance of the transistor drops to a very low value, and the collector of transistor 43 rises from the voltage at the B— terminal substantially to ground potential. A discharge path has now been completed for capacitor 56 through resistor 57 and the emitter-collector path of transistor 43. Capacitor 56, which was hitherto at the voltage of the B— terminal, begins to discharge toward ground potential through resistor 57 and the emitter-collector resistance of the transistor switch 43. The voltage at the junction of capacitor 56 and resistor 57 begins to rise from −B volts towards ground. The time constant of the circuit establishes the initial time delay $\Delta t$, after gating trigger circuit 4 becomes free-running. The time delay is the time necessary for capacitor 56 to discharge sufficiently so that the potential at the junction of capacitor 56 and resistor 57, and hence at emitter 53, is more positive than the voltage at the base 49 to forward-bias emitter 53. That is, the potential rise at the junction must exceed the intrinsic stand-off ratio of the unijunction transistor so that the critical firing voltage, at which the emitter becomes forward-biased, is reached.

When this firing voltage is reached, holes are injected from emitter 53 into the base region. These holes move toward base 49 and results in an equal increase in electrons in the emitter-base region. The net result is a decrease in resistance between emitter and base 49 so that as emitter current increases the emitter voltage decreases, and a negative characteristic is obtained. Capacitor 56 begins to charge through the unijunction emitter-base 49 region from the critical firing voltage towards B—, and the junction of capacitor 56 and resistor 57 becomes more negative as the capacitor charges. However, because of the negative resistance characteristics between emitter 53 and base 49 the voltage at the base side of the emitter junction drops almost instantaneously substantially to the voltage at base 49 which is approximately that at the B— terminal. A potential difference now exists between emitter 53, now at B—, and the junction of capacitor 56 and resistor 57 which has been charging from the critical firing voltage toward B— through resistor 55, the emitter-base 49 junction and base resistor 59. Since capacitor 55 cannot charge to the voltage of B— instantaneously, the capacitor has only partially charged toward B—. Capacitor 54, which has a value of capacitance which is very small compared to that of capacitor 56 (on the order of 1/50th–1/100th of the value), charges very rapidly to a voltage equal to the potential difference between the emitter and the junction, with the polarity indicated. This promptly reverse biases the emitter base junction. Capacitor 54 now discharges through resistor 55, and capacitor 56 begins to discharge towards ground, and the firing voltage from the new voltage level to which has previously charged; a voltage level intermediate, the firing voltage and the voltage at the B— terminal. The time required for capacitor 54 to discharge through resistor 55 is short compared to the time required for capacitor 56 to discharge to the firing voltage from its new voltage level so that the time required for unijunction transistor 48 to fire again and produce a trigger pulse is substantially determined by the R–C time constant of the resistor 57-capacitor 56 combination and the voltage level on capacitor 56. This voltage level is in turn controlled by the combination of capacitor 54 and resistor 55 which prevent capacitor 56 from discharging all the way to B—.

Trigger 4 now enters its free-running state with the unijunction transistor being periodically biased into the conducting state to produce trigger pulses for "one-shot" multivibrator 5. The period of the relaxation oscillator is, as pointed out previously, determined by the R–C time constant of capacitor 56 and resistor 57, and the intermediate voltage level to which capacitor 56 has been permitted to charge by the R–C network consisting of capacitor 54 and resistor 55. At the end of the gating interval, transistor 43 of biased switch 3 is biased into the nonconducting state, and the voltage at its collector drops from ground potential to the potential at the B— terminal. Both base 50 and base 49 of unijunction transistor 48 are now at the potential of the B— terminal, and the base side of the emitter-rectifying junction also drops to this potential. This immediately forward-biases the junction since the interbase voltage has dropped to zero, and unijunction 56 conducts, producing a trigger pulse and starts charging capacitor 56. Since the interbase voltage remains at zero, the emitter remains forward-biased, and capacitor 56 charges rapidly back to the voltage at the B— terminal and remains there until the trigger is again gated by switch 3.

"One-shot" multivibrator 5, which is triggered by the pulses from trigger 4, consists of a pair of PNP junction transistors 60 and 61 having their respective collector and base electrodes cross-coupled through R–C coupling networks 62 and 63. The collector of transistor 60 is connected to the base of transistor 61 through R–C network 62 and the collector of transistor 61 is connected to the base of transistor 60 through network 63. The bases of the individual transistors are also connected through biasing resistor 64 and 65 to ground. The emitters of transistors 60 and 61 are connected to ground through the common emitter resistances 66 and 67. Each of the collector electrodes are also connected to the negative terminal B— of a source of energizing voltage through the collector resistances 68 and 69. The collector of transistor 60 is connected through voltage dropping resistor 70 to one end of energizing coil 71 of the "E" lead switch 6 relay, the other end of which is connected to the B— terminal of the energizing source. In the stable or quiescent state, transistor 61 conducts, and transistor 60 is cut off. With transistor 61 conducting, and at saturation, the saturation collector-emitter voltage is so low that this voltage, which is coupled between the base and emitter of transistor 60 through network 63 and resistor 64, is not sufficient to forward-bias the emitter-base junction of transistor 60. Transistor 60 is thus maintained in the nonconducting state. With transistor 60 in the nonconducting state, the potential at its collector is substantially that of the B— terminal, and, hence, coil 71 of "E" lead switch relay 6 is de-energized since both terminals of the relay coil are substantially at the B— voltage.

The positive trigger pulses from trigger 4 are applied to the base of normally conducting PNP transistor 61, driving the base more positive than the emitter. This reverse-biases the emitter base junction and drives the transistor to cut-off. As transistor 61 becomes nonconducting, the voltage at its collector drops from essentially ground potential to that at the B— terminal. This negative-going pulse edge is applied through network 63 to the base of PNP transistor 60, forward-biasing its base-emitter junction and driving it into the conducting state. When transistor 60 conducts the voltage at its collector rises from B— to essentially ground potential and establishes an energizing voltage across coil 71, energizing "E" lead switch relay and actuating a contact 72 which connects the "E" lead 7 to ground. The relay 71 also controls switch 36 in the alternate rectifying path 30 of rectifier 2 as well as other contacts which may, for example, connect the audio line into the central terminal.

Connected to "one-shot" multivibrator 5 is a timing circuit, shown generally at 8, which establishes the duration of the conducting period of transistor 60 and, hence, the energizing period of "E" lead switch 6. Timing circuit 8 thus controls the interval before "one-shot" 5 returns to its normal stable state with transistor 61 conducting. Timing circuit 8 includes a unijunction transistor switch 73 having a base 74 connected to the B— terminal and a base 74 connected to the emitters of transistor 60 and 61 through a dropping resistor 76. Emitter 77 of the unijunction transistor is connected to the junction of an R–C network comprising capacitor 78 and a resistance 79. Capacitor 78 is connected between the emitter of the unijunction transistor and the junction of emitter-resistance 66 and 67. Resistor 79 is connected between emitter 77 and the collector of transistor 60. A diode 80 is connected in shunt with resistor 79. Diode 80 and resistor 79 constitute, respectively, the charging and discharging paths for capacitor 78 of the timing network and a capacitor 81 of compensating network 9, presently to be described. Diode 80 is so poled as to be conductive and charge capacitor 78 to the voltage at the B— terminal during the stable or quiescent state of the "one-shot." In the stable state transistor 61 conducts and transistor 60 is cut off. The collector of transistor 60 is essentially at the B— voltage. Since the cathode of the diode is connected to the collector of transistor 60 and its anode is connected to ground through capacitor 78 and emitter-resistor 67, diode 80 is in the conducting state. In the conducting state, diode 80 by-passes resistor 79, and capacitor 78 is rapidly charged to the B— voltage with the polarity shown.

Whenever a positive triggering pulse reverses the states of transistors 60 and 61 so that transistor 60 conducts, the voltage at its collector rises approximately to ground, and diode 80 is reverse-biased. Capacitor 78 now begins to discharge through resistor 79. In the absence of Compensating Network 9, the discharge rate of capacitor 78 is fixed by the R–C time constant of capacitor 78 and resistor 79, and emitter 77 becomes sufficiently positive to fire unijunction transistor 73 a fixed time after the "one-shot" has been triggered by the input pulse. When unijunction transistor 73 fires, a short negative-going pulse is generated at base 75.

For additional information on unijunction transistors, relaxation oscillators using unijunction transistors, and the nature and polarity of the output pulse waveforms, reference is hereby made to the "General Electric Transistor Manual," third edition, published by the General Electric Company, Semiconductor Products, 1224 W. Genessee Street, Syracuse, New York, (1958), pages 56–62, and particularly to FIG. 88 on page 59.

The negative pulse is coupled through resistor 75 to the emitter of PNP transistor 60, reverse-biasing the base-emitter junction and driving transistor 60 to cut off. The voltage at the collector of transistor 60 goes substantially to the voltage at the B— terminal so that a negative pulse is applied to the base of transistor 61, returning that transistor to the conducting state. Diode 80 now conducts as the collector of transistor 60 is once again at B— and capacitor 78 rapidly charges back to B—, driving unijunction transistor 73 to cut off. "One-shot" multivibrator 5 remains in the stable condition with transistor 61 conducting until the appearance of the next positive triggering pulse, whereupon the same sequence of events is repeated. Thus, it will be noted that in the absence of compensating network 9, "one-shot" multivibrator 5 returns to its stable state a fixed period of time after the apperance of the trigger pulse. Hence, the duration of the "E" lead switch energizing pulse (i.e., that period during which transistor 60 is conducting) is fixed and is determined by the time constant of the R–C network consisting of capacitor 78 and resistor 79 and the intrinsic characteristics of unijunction transistor 73.

As was pointed out previously in the general discussion of the invention, if the duration of the energizing voltage to the "E" lead switch remains constant, the ratio of "E" lead "make" to "break" time varies with variations in telephone dialing speed, and the "make" and "break" periods of the dial tone impulses vary. Compensating network 9 controls and modifies the timing action of timing circuit 8 by varying the discharge rate of capacitor 78, thereby varying the time interval necessary to fire unijunction transistor 73. The timing action of timing circuit 8 is so modified that if the input trigger rate to "one-shot" 5 increases, (which represents a decrease in the "make" and "break" period of the tone pulses and thus an increase in the dialing rate) the time that "one-shot" 5 remains in the unstable state and, hence, the duration of the "E" lead relay energizing pulse is correspondingly reduced. The "E" "make" to "break" time ratio thus remains constant even if the dial speed increases.

Similarly, if the trigger pulse rate decreases (which represents an increase in the "make" and "break" period of the tone pulses and thus a decrease in the telephone dialing rate) the duration of the "E" lead switch energizing pulse is increased to maintain the "E" lead "make" to "break" time ratio constant.

Compensating network 9 produces a control or compensating voltage which is a function of the time that "one-shot" multivibrator 5 is in its stable or quiescent condition. This voltage is utilized to control the discharge time of timing circuit 8, thereby adjusting the time necessary for the "one-shot" to return to its quiescent state after being triggered and the duration of the "E" lead relay energizing pulse. The lower the trigger pulse repetition rate the greater is the time interval between the pulses. The time that the circuit is in the stable state, therefore, also increases. The control voltage from compensating network 9 is correspondingly greater which, in turn, increases the time necessary for timing circuit 8 to fire the unijunction transistor and return the "one-shot" to the stable condition. Thus, with a decrease in the trigger pulse rate causes an increase in the duration of the "E" lead energizing pulse so that the "E" lead "make" to "break" time ratio is maintained substantially constant. Conversely, an increase in the trigger pulse rate reduces the time that the "one-shot" 5 is in the stable state. The control voltage provided by network 9 is also reduced which reduces the time interval before unijunction transistor 73 fires. The duration of the "E" lead energizing pulse is shortened, maintaining the "E" lead "make" to "break" substantially constant.

Compensating network 9 includes an R–C network comprising storage capacitor 81 connected to the collector of transistor 61 through resistor 82, and diode 85. Capacitor 81 is also connected to the junction of timing circuit capacitor 78 and the changing diode 80. A shunt diode 84 is connected between the junction of resistor 82 and capacitor 83 and ground. Diode 83 is poled to be conductive only when transistor 61 is in the conducting state, and its collector is substantially at ground potential, i.e., "one-shot" multivibrator 5 is in its stable or quiescent state. With "one-shot" multivibrator 5 in a quiescent state and transistor 61 conducting, a charging path for capacitor 81 is established, and the capacitor charges to a voltage proportional to the time "one-shot" 5 is in the stable state. The potential at the collector of conducting transistor 61 is at ground potential, and diode 83 conducts; the collector of nonconducting transistor 60 is substantially at the B— voltage, and diode 80 conducts. Charging current flows from ground (through transistor 61) through diode 83, resistor 82, to capacitor 81, and thence through diode 81 to the B— terminal. Capacitor 83 is charged to the polarity shown during the interval that "one-shot" multivibrator is in the quiescent state.

The magnitude of the voltage to which capacitor 81 charges is a function of the charging interval which is, in turn, controlled by the time that the "one-shot" is in the stable or quiescent condition. The R–C time constant is large compared to that of the timing circuit so that the rate at which capacitor 81 charges towards the voltage at B— is very slow compared with the rate at which timing capacitory 78 charges (capacitor 78 always charges rapidly to the B— voltage). The capacitance of capacitor 81 is substantially greater than that of timing capacitor 78 so that their combined discharge rate through common discharge resistor 79 is substantially less than that of timing capacitor 78 alone (i.e., R–C, the time constant is increased manifold). Thus, the voltage on capacitor 81 controls the combined discharge time of the capacitor and varies the time which must expire before the voltage at the junction of capacitors 78 and 81, resistor 79, and unijunction emitter 77 is sufficiently positive to forward bias the emitter and fire unijunction transistor 73, returning the "one-shot" to its stable state. When "one-shot" multivibrator 5 is triggered, terminating conduction of transistor 61 and initiating conduction of transistor 60, the collector of transistor 61 drops essentially to the voltage at the B— terminal, and diode 83 is reverse-biased and becomes nonconducting. The charging path for capacitor 81 is thus interrupted. Capacitor 78 of timing circuit 8, which is charged to the value at the B— terminal, now begins to discharge through resistance 79. Capacitor 81, which is not charged to the full B— value but to some lesser value between B— and the critical firing voltage of unijunction transistor 73, does not start to discharge until capacitor 78 has discharged to the voltage level at capacitor 81. That is, as long as the voltage across capacitor 78 exceeds the voltage across the capacitor 81, diode 84 is reverse-biased, and capacitor 81 cannot discharge. This may be seen by considering the fact that with transistor 60 conducting and its collector substantially at ground potential, capacitor 78 and emitter-resistor 67 are in shunt with the discharge resistance 79 and with the series combination of capacitor 83 and diode 86. Thus, the voltage across these three shunt circuits must be equal. As the voltage across capacitor 78 is substantially that of the B— terminal, the sum of the voltages across capacitor 83 is and diode 84 must also equla the B— voltage. However, since the voltage across capacitor 81 is less than B—, the difference voltage appears across diode 84 which is reverse-biased by an amount equal to the difference between the voltages across these two capacitors. Hence, diode 86 is in a nonconducting state and prevents discharge of capacitor 81 until capacitor 78 has discharged sufficiently to reduce the voltage across the capacitor and the voltage at its junction with emitter 77 to the voltage to which capacitor 83 is charged. Once that point is reached, dioded 86 becomes conductive, and capacitor 83 begins to discharge to resistance 79. Using a numerical example in order to simplify the matter further, assume that the voltage at the B— terminal is −36 volts. The voltage across capacitor 78 and at the junction of resistor 79 and capacitor 81 is thus −36 volts with respect to ground. The voltage across the series combination of capacitor 81 and diode 84 must also be −36 volts since this circuit is connected between the junction point and ground. Assume now that capacitor 81 has charged to a value of voltage (−22 volts) intermediate the unijunction transistor critical firing voltage (viz. −16 volts) and the voltage at the B— terminal (−36 volts). The junction of capacitor 81 and diode 84 is thus twenty-two (22) volts more positive than the junction of capacitors 78 and 81 by virtue of the voltage across the capacitor 81 and its polarity. However, this junction is still at −14 volts with respect to ground; the voltage difference across the two capacitors. Since the cathode of diode 84 is grounded, the anode is fourteen (14) volts more negative than the cathode, and the diode is reverse-biased into the nonconducting state. Capacitor 81 cannot discharge until capacitor 78 has discharged to or slightly below the level of the voltage across capacitor 81 at which time the anode of diode 84 becomes more positive than the cathode, and the diode conducts.

When diode 84 conducts and capacitor 81 begins to discharge through the common discharge resistor 79, the time constant of the combined R–C network and, hence, the time required for the voltage to rise to the firing voltage, has been increased substantially since the capacity of the R–C circuit has now been increased. That is, since capacitor 78 and 81 are connected in parallel, the total capacity is the sum of their capacitance; $C_t=C_{78}+C_{81}$. If capacitor 81 is very large compared to capacitor 78 ($C_{81}>>C_{78}$), the time constant is now essentially $C_{81}$ $R_{79}$. The rate of discharge is reduced, and the time required for the emitter voltage to reach the critical firing voltage is correspondingly increased and varies as a function of the voltage level on capacitor 81, thereby controlling the time that transistor 60 remains in the conducting state. It will be obvious that the greater the voltage across capacitor 83 (i.e., the greater the charge "Q" on this capacitor) the longer the interval necessary for the capacitors to discharge sufficiently to raise the voltage at emitter 77 to the triggering point. Conversely, the lower the voltage across capacitor 81, the shorter the time needed for the voltage to rise sufficiently to forward-bias emitter 77. Thus, it can be seen that compensating network 9 produces a voltage across capacitor 81 which controls the interval during which transistor 60 conducts and that both of these are a function of the duration of the quiescent or stable state of "one-shot" 5 which, in turn, is a function of the dialing rate of the remote telephone. The variable "one-shot" multivibrator 5, with its timing circuit and its compensating network, is described and claimed in greater detail in a copending application, Ser. No. 335,024, entitled "Variable One-Shot Multivibrator," filed January 2, 1964, in the name of Cosby A. Draper, Jr., and assigned to the assignee of the present invention.

By adjusting the interval during which transistor 60 of "one-shot" 5 is conducting and, hence, varying the interval that the energizing voltage is applied to the "E" lead switch relay 6, as a function of the trigger pulse repetition frequency, the time ratio of the "E" lead switch "make" to "break" time is maintained substantially constant, even with variations in the dialing speed.

While a particular embodiment of this inventon has been shown, it will, of course, be understood that it is not limited thereto since many modifications, both in the circuit arrangement and the device employed, may be made. It is contemplated by the appended claims to cover any such modifications as fall within the true spirit and scope of this invention.

What I claim as new and desire to secure by Letters Patent of the United States is:

1. In a telephone signalling system for establishing a connection between a calling and a called station in response to pulsed dial tone signals representing the dialing digits, an apparatus for selectively establishing a line connection in response to the pulsed dial tones and for maintaining the line "make" to "break" time ratio substantially constant as the dial tone pulse rate varies, including (a) means responsive to the dial tone signals for producing at least one trigger pulse in response to each dial tone representing a dialing digit, thereby producing a train of trigger pulses in response to a dialing digit tone pulse sequence;

(b) variable pulse generating means responsive to said trigger pulses for producing an energizing pulse of variable width including circuit means responsive to the interval between trigger pulses for varying the pulse width directly as a function of said interval between trigger pulses whereby said pulse width varies inversely with the dial-tone pulse rate;

(c) switch means actuated by said variable width energizing pulses for selectively establishing the line conductive path whereby variation of the energizing pulse width maintains the line "make" to "break" time ratio substantially constant with varying dial pulse rates and varying trigger pulse rates produced in response to the dialing digit tone pulses.

2. In a telephone signalling system for establishing a connection between a calling and a called station in response to pulsed dial tone signals representing the dialing digits, an apparatus for selectively establishing a line connection in response to the pulsed dial tones and for maintaining the line "make" to "break" time ratio substantially constant as the dial tone pulse varies, including (a) means responsive to dial tone signals for generating trigger pulses, including a trigger pulse generator which is gated in response to termination of the tone signal and reaches the free-running state to produce a succession of trigger pulses a predetermined period after being gated and produces a single trigger pulse upon reappearance of the tone signal which disables the said pulse generator, whereby at least one trigger pulse is produced for each dialing digit tone pulse;

(b) variable pulse generating means responsive to said trigger pulses for producing an energizing pulse of variable width including circuit means responsive to the interval between trigger pulses for varying the pulse width directly as a function of the interval between trigger pulses whereby said pulse width varies inversely with the dial-tone pulse rate;

(c) switch means actuated by said variable width energizing pulses for selectively establishing the line conductive path whereby variation of the energizing pulse width maintains the line "make" to "break" time ratio substantially constant with varying dial pulse rates and varying trigger pulse rates produced in response to the dialing digit tone pulses.

3. A telephone signalling system, according to claim 2, wherein the predetermined period required for said pulse generator to reach the free-running state is greater than the interval between tone bursts during the dialing digit tone pulses over the entire range of dialing digit pulse rates whereby said pulse generator produces a single trigger pulse for each dialing digit tone pulse.

4. A telephone signalling system, according to claim 2, wherein the repetition rate of the trigger pulses produced by said trigger pulse generator is sufficiently high so that the time interval or period between pulses is less than the de-energization time of the line switch so that the variable pulse generating means is always retriggered during the free-running period of the trigger pulse generator and the line switch remains energized.

5. In a telephone signalling system for establishing a connection between a calling and a called station in response to pulsed dial tone signals representing the dialing digits, an apparatus for selectively establishing a line connection in response to the pulsed dial tones and for maintaining the line "make" to "break" time ratio substantially constant as the dial tone pulse rate varies, including (a) means responsive to the dial tone signals for producing at least one trigger pulse in response to each dial tone representing a dialing digit, thereby producing a train of trigger pulses in response to a dialing digit tone pulse sequence;

(b) variable pulse generating means responsive to said trigger pulses for producing an energizing pulse of variable width, including a monostable multivibrator which is triggered into the unstable state in response to the trigger pulses;

(c) means for generating a control signal proportional to the interval between pulses by sensing the interval that the monostable multivibrator is in the stable state, the magnitude of said control signal thus being proportional to the trigger pulse rate and, therefore, to dialing digit pulse rate;

(d) means for controlling said multivibrator in response to said control signal to vary the time interval the multivibrator remains in the unstable state and thereby the width of the energizing pulse inversely with the pulse rate of the dialing digits;

(e) switch means actuated by said variable width energizing pulses for selectively establishing the line conductive path, whereby variation of the energizing pulse width maintains the line "make" to "break" time ratio substantially constant with varying dial pulse rates and varying trigger pulse rates produced in response to the dialing digit tone pulses.

References Cited by the Examiner

UNITED STATES PATENTS

| | | | |
|---|---|---|---|
| 2,938,955 | 5/1960 | Molnar | 179—16.4 |
| 3,092,691 | 6/1963 | Burns et al. | 179—16.4 |

FOREIGN PATENTS

| | | |
|---|---|---|
| 900,276 | 7/1962 | Great Britain. |

KATHLEEN H. CLAFFY, *Primary Examiner.*

L. A. WRIGHT, *Assistant Examiner.*